United States Patent
Mori

(10) Patent No.: US 10,496,337 B2
(45) Date of Patent: Dec. 3, 2019

(54) INFORMATION PROCESSING DEVICE, INFORMATION PROCESSING METHOD, AND RECORDING MEDIUM

(71) Applicant: Shinya Mori, Kanagawa (JP)

(72) Inventor: Shinya Mori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/904,604

(22) Filed: Feb. 26, 2018

(65) Prior Publication Data

US 2018/0260165 A1    Sep. 13, 2018

(30) Foreign Application Priority Data

Mar. 7, 2017  (JP) .................................. 2017-042875

(51) Int. Cl.
   *G06F 3/12*    (2006.01)

(52) U.S. Cl.
   CPC .......... *G06F 3/1204* (2013.01); *G06F 3/1222* (2013.01); *G06F 3/1239* (2013.01); *G06F 3/1257* (2013.01); *G06F 3/1273* (2013.01); *G06F 3/1289* (2013.01)

(58) Field of Classification Search
   None
   See application file for complete search history.

(56) References Cited

U.S. PATENT DOCUMENTS

| 2003/0195917 A1 | 10/2003 | Horiyama et al. | |
|---|---|---|---|
| 2005/0141014 A1* | 6/2005 | Kikuchi | G06F 3/121 358/1.14 |
| 2006/0170957 A1 | 8/2006 | Niebling et al. | |
| 2012/0092720 A1* | 4/2012 | Jaudon | G06F 3/1204 358/1.15 |
| 2013/0135673 A1* | 5/2013 | Murakawa | G06F 3/1296 358/1.15 |
| 2015/0029536 A1* | 1/2015 | Suzuki | G06F 21/608 358/1.14 |
| 2016/0253128 A1 | 9/2016 | Mori | |
| 2016/0274833 A1 | 9/2016 | Mori | |
| 2016/0277540 A1 | 9/2016 | Mori | |
| 2017/0142284 A1 | 5/2017 | Mori | |

FOREIGN PATENT DOCUMENTS

| JP | 2012-014345 | 1/2012 |
|---|---|---|
| JP | 2013-214198 | 10/2013 |

OTHER PUBLICATIONS

Extended European Search Report dated Jul. 25, 2018.

* cited by examiner

*Primary Examiner* — Fan Zhang

(74) *Attorney, Agent, or Firm* — Harness, Dickey & Pierce, P.L.C.

(57) ABSTRACT

An information processing device includes a memory to store a print job to be executed with an image forming apparatus and a specific printing rule, and circuitry. The circuitry acquires from an external device the specific printing rule according to a specific condition. The acquired specific printing rule is stored in the memory. The external device stores printing rules including the specific printing rule. Each printing rule defines at least a part of printing settings applied in executing the print job. The circuitry acquires from the memory the specific printing rule according to an attribute of printing associated with the print job in executing the print job, and executes the printing job while applying the acquired specific printing rule.

15 Claims, 13 Drawing Sheets

| PRINTING RULE ID | PRINT CONDITION | PRINT ACTION | ASSOCIATED ID | UPDATE TIME |
|---|---|---|---|---|
| 1 | COLOR PRINTING | MONOCHROME | 1 | 2016/2/1 15:00 |
| 2 | SIMPLEX PRINTING | DUPLEX | 2 | 2016/2/1 15:30 |
| 3 | 10 OR MORE PAGES | STORING | 3 | 2016/2/1 16:00 |
| 4 | . | . | 4 | . |
| 5 | . | . | 5 | . |
| 6 | . | . | 6 | . |
| 7 | . | . | 7 | . |
| 8 | . | . | 8 | . |
| 9 | . | . | 9 | . |
| 10 | . | . | 10 | . |
| . | . | . | . | . |
| . | . | . | . | . |

| PRINTING RULE ID | PRINT CONDITION | PRINT ACTION | ASSOCIATED ID | UPDATE TIME |
|---|---|---|---|---|
| 1 | COLOR PRINTING | MONOCHROME | 1 | 2016/2/1 15:00 |
| 2 | SIMPLEX PRINTING | DUPLEX | 2 | 2016/2/1 15:30 |
| 3 | 10 OR MORE PAGES | STORING | 3 | 2016/2/1 16:00 |
| 4 | . | . | 4 | . |
| 5 | . | . | 5 | . |

| PRINTING RULE ID | PRINT CONDITION | PRINT ACTION | ASSOCIATED ID | UPDATE TIME |
|---|---|---|---|---|
| 1 | COLOR PRINTING | MONOCHROME | 1 | 2016/2/1 15:00 |
| 2 | SIMPLEX PRINTING | DUPLEX | 2 | 2016/2/1 15:30 |
| 3 | 10 OR MORE PAGES | STORING | 3 | 2016/2/1 16:00 |

FIG. 10A

| ASSOCIATED ID | OUTPUT APPARATUS ID | USER ID | APPLY SECURE PRINTING | UPDATE TIME |
|---|---|---|---|---|
| 1 | 1 | – | false | 2016/2/1 15:00 |
| 2 | 2 | 1, 2, 3 | false | 2016/2/1 15:30 |
| 3 | 3 | – | true | 2016/2/1 16:00 |
| 4 | . | . | . | . |
| 5 | . | . | . | . |
| 6 | . | . | . | . |
| 7 | . | . | . | . |
| 8 | . | . | . | . |
| 9 | . | . | . | . |
| 10 | . | . | . | . |
| . | . | . | . | . |
| . | . | . | . | . |
| . | . | . | . | . |

FIG. 10B

| ASSOCIATED ID | OUTPUT APPARATUS ID | USER ID | APPLY SECURE PRINTING | UPDATE TIME |
|---|---|---|---|---|
| 1 | 1 | – | false | 2016/2/1 15:00 |
| 2 | 2 | 1, 2, 3 | false | 2016/2/1 15:30 |
| 3 | 3 | – | true | 2016/2/1 16:00 |
| 4 | . | . | . | . |
| 5 | . | . | . | . |

FIG. 10C

| ASSOCIATED ID | OUTPUT APPARATUS ID | USER ID | APPLY SECURE PRINTING | UPDATE TIME |
|---|---|---|---|---|
| 1 | 1 | – | false | 2016/2/1 15:00 |
| 2 | 2 | 1, 2, 3 | false | 2016/2/1 15:30 |
| 3 | 3 | – | true | 2016/2/1 16:00 |

FIG. 11

| TERMINAL ID | TERMINAL NAME | IP ADDRESS | REGISTRATION TIME |
|---|---|---|---|
| 1 | Host1 | 192.168.0.100 | 2016/2/1 15:00 |
| 2 | Host2 | 192.168.0.110 | 2016/2/1 15:30 |
| 3 | Host3 | 192.168.0.120 | 2016/2/1 16:00 |
| ⋮ | ⋮ | ⋮ | ⋮ |

| HISTORY ID | OUTPUT DESTINATION IP ADDRESS | USE TIME |
|---|---|---|
| 1 | 192.168.0.100 | 2016/2/1 15:00 |
| 2 | 192.168.0.110 | 2016/2/1 15:30 |
| 3 | 192.168.0.120 | 2016/2/1 16:00 |
| ⋮ | ⋮ | ⋮ |

1201

| OUTPUT APPARATUS ID | OUTPUT DESTINATION IP ADDRESS | USE TIME |
|---|---|---|
| 1 | 192.168.0.200 | 2016/2/1 15:00 |
| 2 | 192.168.0.200 | 2016/2/1 15:30 |
| 3 | 192.168.0.202 | 2016/2/1 16:00 |
| ⋮ | ⋮ | ⋮ |

INFORMATION PROCESSING DEVICE, INFORMATION PROCESSING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2017-042875, filed on Mar. 7, 2017, in the Japan Patent Office, the entire disclosure of which is hereby incorporated by reference herein.

BACKGROUND

Technical Field

The present disclosure relates to an information processing apparatus, an information processing method, and a recording medium.

Related Art

A rule-based printing system including a client terminal and a print server that are connected to each other via a communication network are known. In the rule-based printing system, a printing rule that is set in advance is applied to a print job to be executed, when conditions of the print job is satisfied.

In such a rule-based printing system, when a print job is transmitted to the print server from an information processing device that is a request source of the print job, content of print settings indicated with the print job is changed in a server-side in a manner that preset conditions are satisfied In the rule-based printing system, a client PC stores one or more printing rules to be applied in executing the print job. In a case of a large-scale of the rule-based printing system that includes a plurality of print servers, the number of printing rules to be distributed to the client PC in advance is large.

SUMMARY

An information processing device includes a memory to store a print job to be executed with an image forming apparatus and a specific printing rule, and circuitry. The circuitry acquires from an external device the specific printing rule according to a specific condition. The acquired specific printing rule is stored in the memory. The external device stores printing rules including the specific printing rule. Each printing rule defines at least a part of printing settings applied in executing the print job. The circuitry acquires from the memory the specific printing rule according to an attribute of printing associated with the print job in executing the print job, and executes the printing job while applying the acquired specific printing rule.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 9A to 9C are tables illustrating applicable printing rules according to one of the embodiments;

FIGS. 10A to 10C are tables illustrating association information associated with the applicable printing rules according to one of the embodiments;

FIG. 11 is a table illustrating terminal registration information according to one of the embodiments;

FIG. 12 is a table illustrating output history information according to one of the embodiments;

Figure 1:
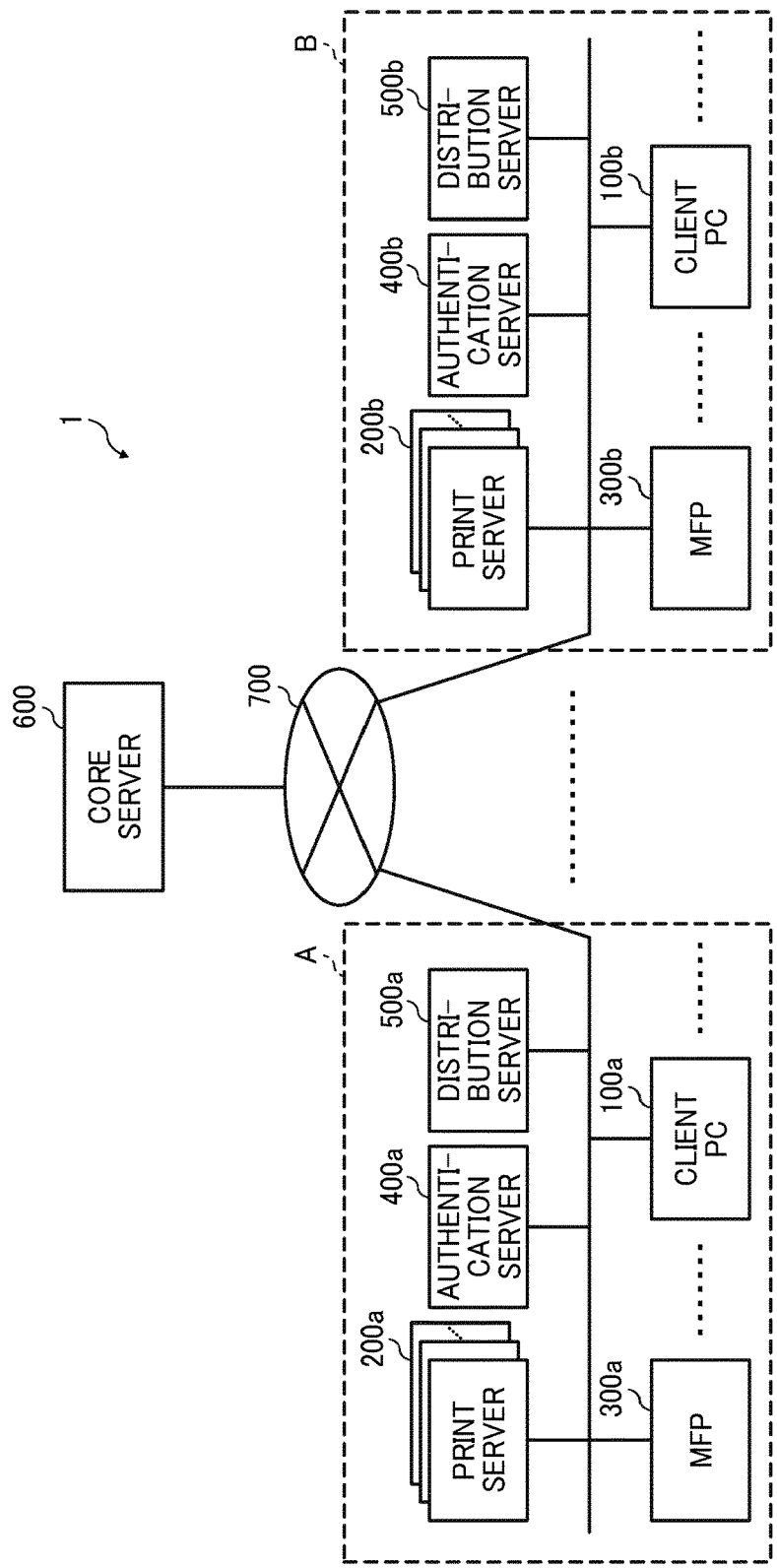
FIG. 1 is a schematic block diagram illustrating an overall configuration of a printing system according to one of the embodiments of the present disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

An information processing apparatus, an information processing method, and an information processing program according to one of the embodiments of the present disclosure, are described below with reference to the drawings. The present disclosure is not limited to specific embodiments described below, and numerous additional modifications and variations are possible in light of the teachings within the technical scope of the appended claims.

A client terminal that is an information processing apparatus according to one of the embodiments, when distributing rule information defining processing content in advance in executing a print job, selects the rule information to be distributed based on an operation history of the client terminal. The information processing apparatus according to the embodiment acquires printing rules required to execute the print job, resulting in reducing load of the processing of acquiring the printing rule(s).

<Information Processing System>

A description is given of an information processing system according to one of the embodiments. According to the present embodiment, printing rule(s) applied in executing a print job with a client PC 100 is a part of the printing rules stored in the entire system. In this embodiment, all printing rules applicable in the system are stored in a core server 600, which is a management apparatus. The client PC 100, which is an information processing apparatus, out of the printing rules being stored, only printing rule(s) that are needed based on conditions.

FIG. 1 is a schematic block diagram illustrating an overall configuration of a rule-based printing system 1 according to one of the embodiments. In the following description, the rule-based printing system 1 includes, for example, a plurality of apparatuses each of which is provided at one of a plurality of sites including a site A (first site) and a site B (second site). The sites including the site A and the site B includes, for example, an office or a facility belonging to a company. For example, the site A is an office or a facility located in Japan and the site B is an office or a facility located in the United States of America. Namely the plurality of sites are located physically separated from each other.

There are two sites, site A and site B, illustrated in FIG. 1, however the embodiment is not limited thereto, and there may be more than two sites. As illustrated in FIG. 1, an alphabet of small letter, "a", is given to at an end of a numeral reference indicating an apparatus belonging to the site A. Similarly, an alphabet of small letter, "b", is given at an end of a numeral reference indicating an apparatus belonging to the site B. In the following description, when common matters of each apparatus are described without distinguishing the site A and the site B, the alphabets, "a" and "b", are omitted from the end of the reference numerals.

The rule-based printing system 1 includes the plurality of apparatuses each of which is provided in one of the sites. The rule-based printing system 1 includes one or more print servers 200, one or more client PCs 100, one or more multi-function peripherals (MFPs) 300, one or more authentication servers 400, and a core server 600. The above-mentioned apparatuses are connected to each other through a local area (LAN) or a communication network 700 such as the Internet.

(Client PC 100)

The client PC 100, which is one example of the information processing apparatus according to one of the embodiments of the disclosure, is a client terminal that is used by a user in each site. The client PC 100 causes the print server 200 to store a print job. The client PC 100 also has a function of storing a print job according to user operation.

The client PC 100 further has a function of acquisitioning necessary printing rule(s) by filtering based on information including, for example, attributes of the print job and terminal information including own terminal attributes.

(Print Server 200)

The print server 200, which is one example of the information processing apparatus, according to one of the embodiments of the disclosure is set as a data/information reference destination referred by the client PC 100 and the MFP 300 in each site. The print server 200 stores a print job transmitted from the client PC 100. The print server 200 performs processing in response to a request to execute the print job (execution request) received from the MFP 300.

The print server 200 further has a function of extracting printing rule(s) required in the client PC 100 and acquiring the extracted printing rule(s) from the all printing rules applicable in the entire rule-based printing system 1, according to a request from the client PC 100.

(MFP 300)

The MFP 300, which is an output apparatus, performs output processing related to a print job in response to a request to execute a print job (print job execution request) input by a user. The MFP 300 executes the print job stored in the client PC 100 or the print server 200 that is provided in the same site as the MFP 300.

(Authentication Server 400)

The authentication server 400, which is implemented with one or more information processing apparatuses (each may be a computer) provides a function of authenticating a user who requests, with the MFP 300, to execute a print job as a user having an authority for the execution.

(Distribution Server 500)

The distribution server 500, which may be implemented by one or more computers, performs workflow processing, which is set in advance, on subject data (process target data) that includes, for example, data stored in the MFP 300 and data transmitted from the client PC 100.

(Core Server 600)

The core server 600 operates as a management apparatus that manages information and distributes the information including the print data and print job management information among the plurality of sites. The core server 600 enables, for example, the MFP 300a in the site A to execute a print job using print data stored in the print server 200b in the site B and to execute a proxy printing, in which a proxy user execute the print job.

The core server 600 centrally stores all of the user information stored in the authentication server 400 of each site and location information indicating a location of information associated with a print job stored in the print server 200 and the client PC 100 of each site. The core server 600 also stores all of the printing rules applicable in the rule-based printing system 1, and information related to all of the apparatuses, such as the client PC 100 and the print server 200, included in the rule-based printing system 1. One example of the information related to the apparatus is an internet protocol (IP) address. Additionally, the core server 600 is located in, for example, a data center, that is, provided at a location independent of each of the sites. In some of the embodiments, the information processing apparatus having the same function as the core server 600 is provided in one of the sites. In this case, one of the print servers 200 may serve as the core server 600.

(Hardware Configuration of Client PC 100)

Figure 13:
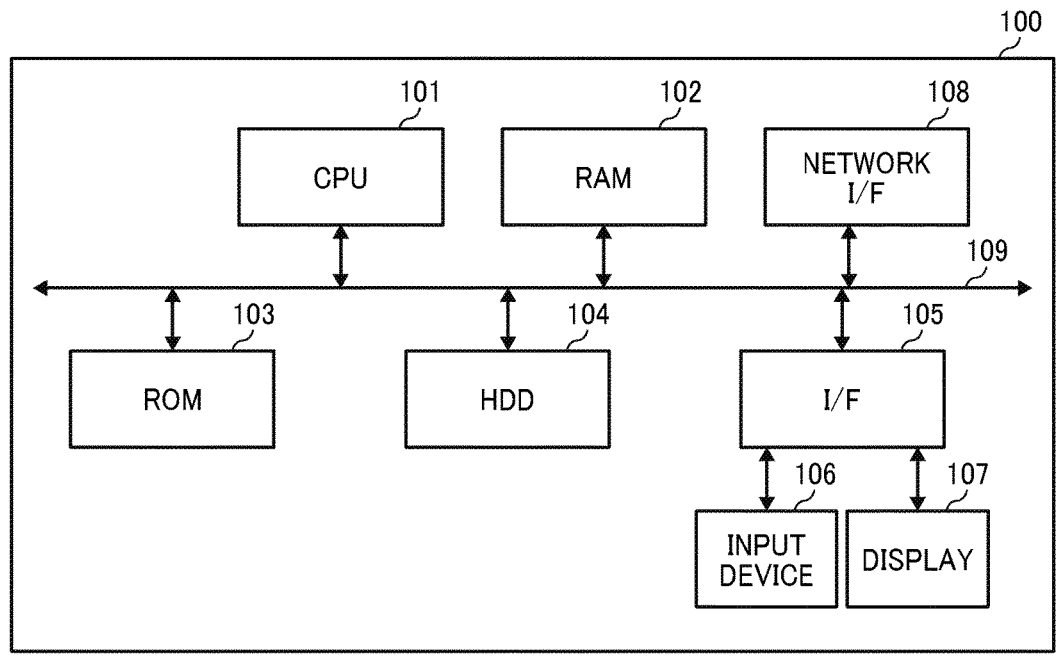
FIG. 13 is a schematic block diagram illustrating a hardware configuration of the information processing apparatus according to one of the embodiments.

FIG. 13 is a diagram illustrating an example of a hardware configuration of the client PC 100 according to the present embodiment. The client PC 100 includes, for example, a central processing unit (CPU) 101, a random access memory (RAM) 102, a read only memory (ROM) 103, a hard disc drive (HDD) 104, an interface (I/F) 105, an input device 106, a display 107, and a network I/F 108, which are connected to each other through a bus 109. In some of the embodiments, each of the input device 106 and the display 107 is not always connected, but is connected when being used.

The input device 106 includes, for example, a keyboard and a mouse, and is used by the user to input various instructions to cause the input device 106 to generate operation signals. The display 107 displays a result of processing performed by the client PC 100.

The network I/F 108 connects the client PC 100 to the communication network 700. With this configuration, the client PC 100 performs data communication via the network I/F 108.

The HDD 104 is a nonvolatile storage device that stores programs and data. Examples of the programs and the data stored in the HDD 104 include an operating system (OS), which is basic software used for controlling overall operation of the client PC 100, and application software providing various functions on the OS.

The I/F 105 is an interface that connects to external devices. The external devices include a recording medium. With this configuration, the client PC 100 reads and writes data and programs from and to the recording medium via the I/F 105. Examples of the recording medium include a flexible disc, a compact disc (CD), a digital versatile disc (DVD), a secure digital (SD) memory card, and a universal serial bus (USB) memory.

The ROM 103 is a nonvolatile semiconductor memory (storage device) capable of storing programs and data so as to keep the stored programs and data even when the power is turned off. The ROM 103 stores a Basic Input/Output System (BIOS) executed in starting the client PC 100, an OS configuration, and programs and data for network settings, for example. The RAM 102 is a volatile semiconductor memory (storage device) that temporarily stores programs and data.

The CPU 101 reads programs and data from a storage device such as the ROM 103 and the HDD 104 onto the RAM 102, and executes processing to control the client PC 100 and implements the functions of the client PC 100.

Hardware Configuration of Print Server 200

Figure 14:
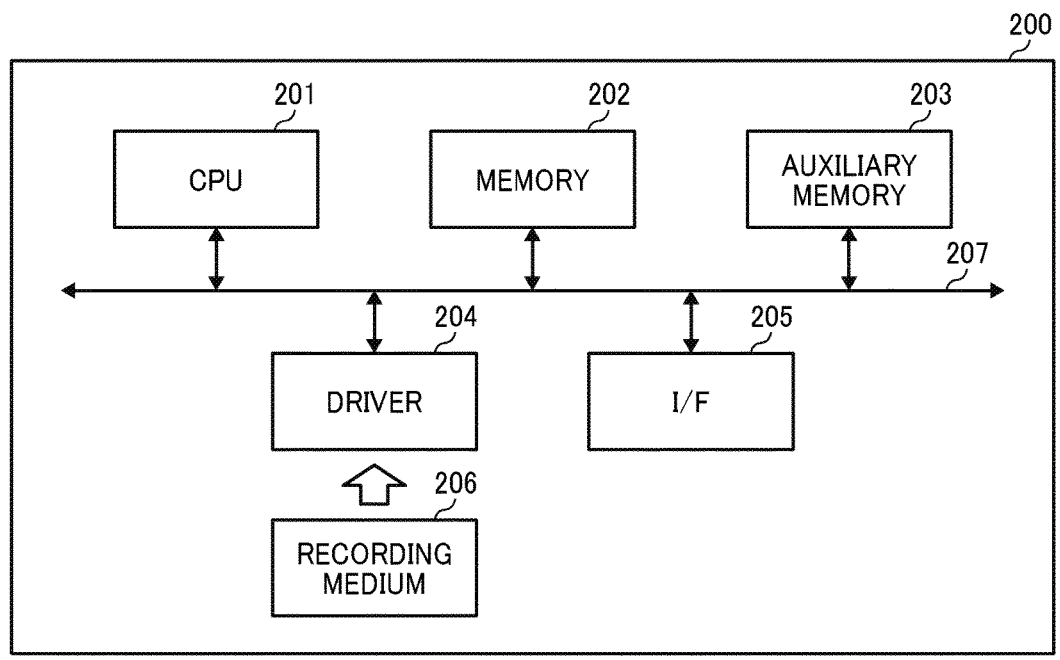
FIG. 14 is a schematic block diagram illustrating a hardware configuration of the site server according to one of the embodiments.

FIG. 14 is a diagram illustrating an example of a hardware configuration of the print server 200 according to the embodiment. The print server 200 illustrated in FIG. 14 includes a CPU 201, a memory 202, an auxiliary memory 203, a driver 204, an I/F 205 which are connected to each other through a bus 207.

The functions of the print server 200 are implemented by executing a program using one or more of the above-mentioned hardware resources. The program is provided with a recording medium 206 such as a compact disc read only memory (CD-ROM). When the recording medium 206 storing the program is set in the driver 204, the program is loaded to the auxiliary memory 203 from the recording medium 206 via the driver 204. The program, however, is not necessary to be loaded using the recording medium 206, and in some of the embodiments, the program is downloaded from a computer through a network. The auxiliary memory 203 also stores, for example, necessary files and data, in addition to the loaded program.

In response to an instruction to activate the program, the memory 202 reads the program from the auxiliary memory 203 and stores the read program. The CPU 201 executes the function associated with the print server 200 according to the program stored in the memory 202. The I/F 205 is used for connecting to the print server 200 the network.

Additionally, in some of the embodiments, each of the print servers 200 is implemented with a plurality of computers each of which has a configuration as illustrated in FIG. 14. Additionally, the core server 600 may also have the same hardware configuration as the print server 200.

(Hardware Configuration of MFP 300)

Figure 15:
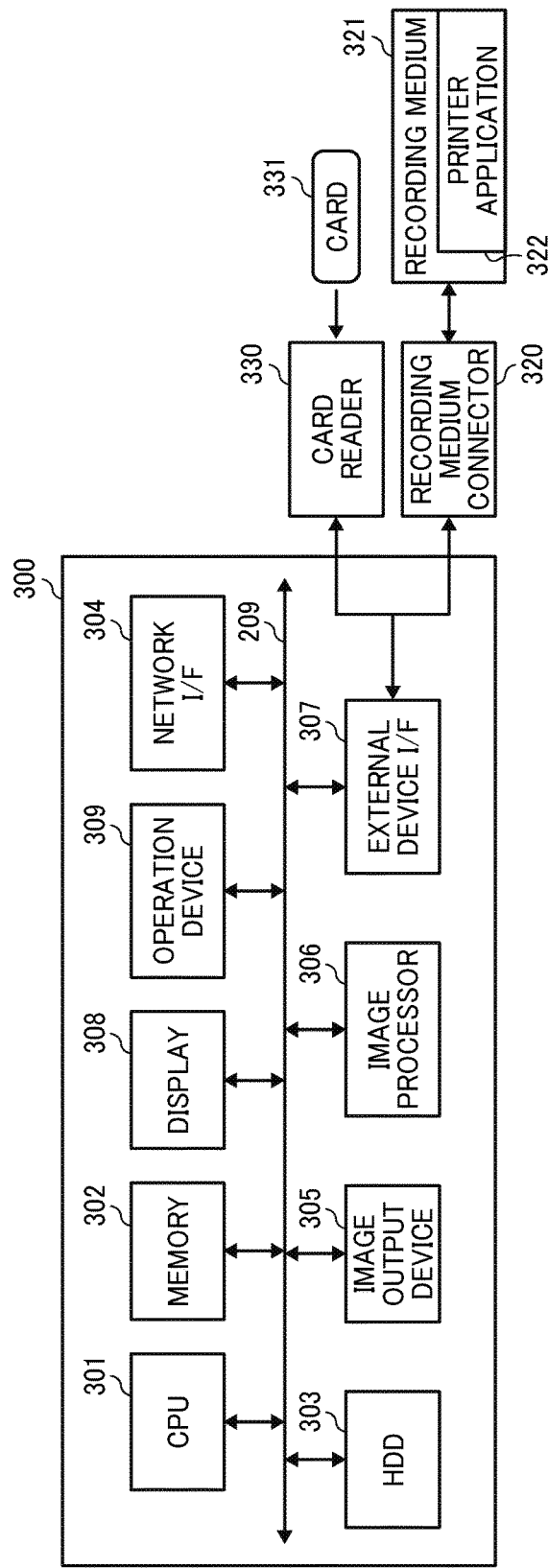
FIG. 15 is a schematic block diagram illustrating a hardware configuration of an output apparatus according to one of the embodiments.

FIG. 15 is a block diagram illustrating an example of a hardware configuration of the MFP 300. The MFP 300 includes a CPU 301, a memory 302, an HDD 303, which is an auxiliary storage device, a network I/F 304, an image output device 305, an image processor 306, an external device I/F 307, a display 308, and an operation device 309.

A program that implements a function in the MFP 300 is recorded (stored) in a nonvolatile auxiliary storage device such as the HDD 303. Various types of applications are installed for implementing corresponding programs, and here in the description of the embodiment, an application referred to as a printer application is used. The HDD 303 stores, for example, necessary files and data in addition to the installed program. In response to an instruction to activate the printer application, the memory 302 reads the program from the HDD 303 and stores the read program. The CPU 301 executes the functions associated with the MFP 300 according to the printer application stored in the memory 302. The network I/F 304 is used for connecting to the network.

The display 308 includes, for example, a liquid crystal display (LCD), and displays an operation screen, a message. In some embodiments, the display 308 is not mounted in the MFP 300, especially when a size of the MFP 300 is small. The operation device 309 includes a button (key), which is hardware, and receives input operation of the user. The display 308 includes a touch panel. The display 308 and the operation device 309 are integrally configured as a control panel.

The image processor 306 performs various types of image processing required when outputting (printing) the print data. The image output device 305 outputs (prints) the print data.

The external device I/F 307 is an interface for connecting with a card reader 330 used for inputting authentication information. The external device I/F 307 includes, for example, a USB port (USB host interface) and a serial port. The card reader 330 is a card reading device that reads information from a card 331, and includes a hardware interface (for example, a USB connector or a serial interface) connectable to the external device I/F 307. In some of the embodiments, the card reader 330 is built in the MFP 300. The card reader 330 may be any one of a contact type and contactless type. The card 331 is not limited to an integrated circuit (IC) card, but any types of cards are usable as long as each type of card is able to record a card identifier (ID) (card number), which is unique to the card.

The card 331 is used for a login process for authenticating the user as an authorized user in executing a print job with the MFP 300. In performing the pull printing, the card number recorded in the card 331 is input to the MFP 300 when the user causes the card reader 330 of the MFP 300 to read the card 331. The MFP 300 transmits the card number to the authentication server 400. The authentication server 400 authenticates that the user associated with the received card number is a user who is authorized to execute the pull printing with the MFP 300, and transmits a result of the authentication to the MFP 300. The MFP 300 determines the subsequent operation based on the authentication result transmitted from the authentication server 400.

Further, a recording medium connector 320 is connected to the external device I/F 307. When the recording medium connector 320 is connected to a recording medium 321, data stored in the recording medium 321 are transmitted to the CPU 301 or the memory 302. The recording medium 321 includes, for example, a USB memory, an SD card memory, and a CD-ROM. The recording medium 321 stores a printer application 322, and the printer application 322 is distributed in a state of being stored in the recording medium 321 or distributed from a server via the network I/F 304.

Hereinafter, a description is given of a functional configuration of each of the print server 200, the client PC 100, and the core server 600.

(Functional Configuration of Client PC 100)

Figure 2:
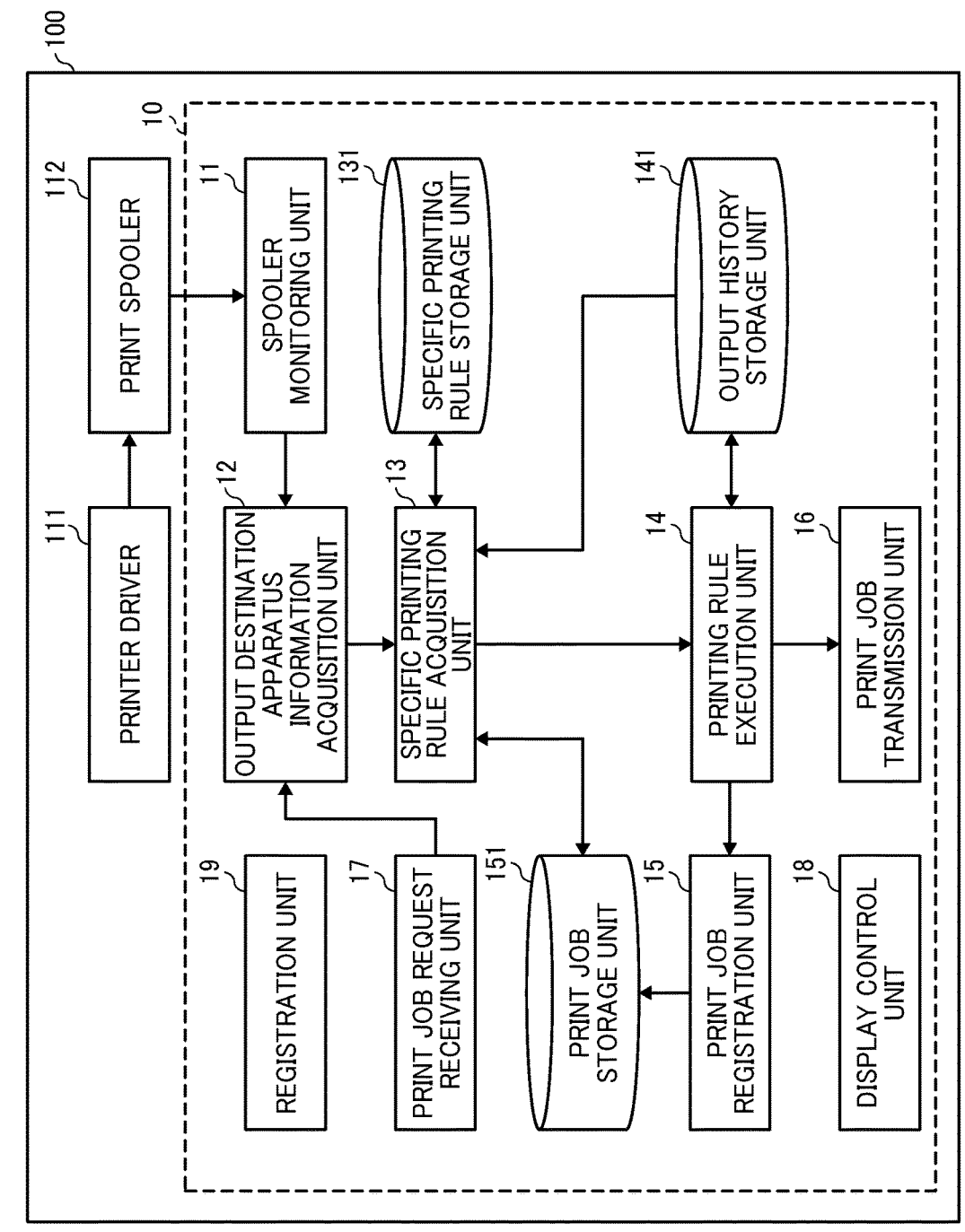
FIG. 2 is a schematic block diagram illustrating a functional configuration of an information processing apparatus according to one of the embodiments.

FIG. 2 is a schematic block diagram illustrating one example of a functional configuration of the client PC 100. Referring to FIG. 2, the client PC 100 includes a spooler monitoring unit 11, an output destination apparatus information acquisition unit 12, a specific printing rule acquisition unit 13, a printing rule execution unit 14, a print job registration unit 15, print job transmission unit 16, a print job request receiving unit 17, a display control unit 18, and a registration unit 19.

The client PC 100 further includes a specific printing rule storage unit 131, an output history storage unit 141, a print job storage unit 151, each of which is configured to store information used for the operation of each functional unit mentioned above. Each of these storage units is implementable with, for example, the HDD 104 included in the client PC 100. Alternatively, each of these storage units is implementable with a storage device connected to the client PC 100 through a network.

A printer driver 111 and a print spooler 112 are not parts of a client application 10. The print spooler 112 is accompanied to the operating system (OS) used with the client PC 100, and the printer driver 111 is separately provided according to an environment where the client PC 100 is used.

The spooler monitoring unit 11 monitors storage (storing operation) of print jobs from the printer driver 111 to the print spooler 112. The spooler monitoring unit 11 refers to a parameter of the stored print data to determine whether an output destination of the print data is designated and if the output destination is designated, acquires an IP address of an apparatus that is the output destination.

The specific printing rule acquisition unit 13 selects and acquires a specific printing rule stored in the specific printing rule storage unit 131 based on the IP address acquired by the output destination apparatus information acquisition unit 12. The specific printing rule acquisition unit 13 also selects a specific printing rule stored in the specific printing rule storage unit 131 based on an IP address of an output destination included in the print job received by the print job request receiving unit 17. A detailed description of selecting a specific printing rule is deferred. The specific printing rule acquisition unit 13 transfers to the printing rule execution unit 14 the print job to which the selected specific printing rule is applied.

Further, the specific printing rule acquisition unit 13 uses output history data stored in the output history storage unit 141 to obtain from the printing rules stored in the print server 200, a "specific printing rule" that satisfies predetermined conditions to be stored in the specific printing rule storage unit 131.

When the print job transferred from the specific printing rule acquisition unit 13 is "secure printing" for performing storage processing, the printing rule execution unit 14 transfers the print job to the print job registration unit 15. The print job registration unit 15 causes the print job storage unit 151 to store the print job transferred from the printing rule execution unit 14.

When the print job transferred from the specific printing rule acquisition unit 13 is not "secure printing" for performing the storage processing, but "direct printing" for transmitting directly to the MFP 300, the printing rule execution unit 14 transfers the print job to the print job transmission unit 16 without transferring to the print job registration unit 15. Additionally, even when the print job transferred from the specific printing rule acquisition unit 13 is "secure printing" for performing the storage processing, if the storage destination is the print server 200, the printing rule execution unit 14 transfers the print job to the print job transmission unit 16 without transferring to the print job registration unit 15.

The print job transmission unit 16 transmits the print job transferred from the printing rule execution unit 14 to the MFP 300 designated as the output destination in the print job.

The print job request receiving unit 17 receives a request to execute the print job (print job execution request) from the MFP 300. The print job request receiving unit 17 transfers to the specific printing rule acquisition unit 13 information identifying the print job related to the print job execution request and the IP address of the MFP 300 that is a transmission source of the request.

The display control unit 18 controls the display 107 included in the client PC 100 to display message related to processing.

The registration unit 19 transmits terminal information including the IP address of the client PC 100 to the print server 200 serving as a site server when the client PC 100 starts up.

(Functional Configuration of Print Server 200)

Figure 3:
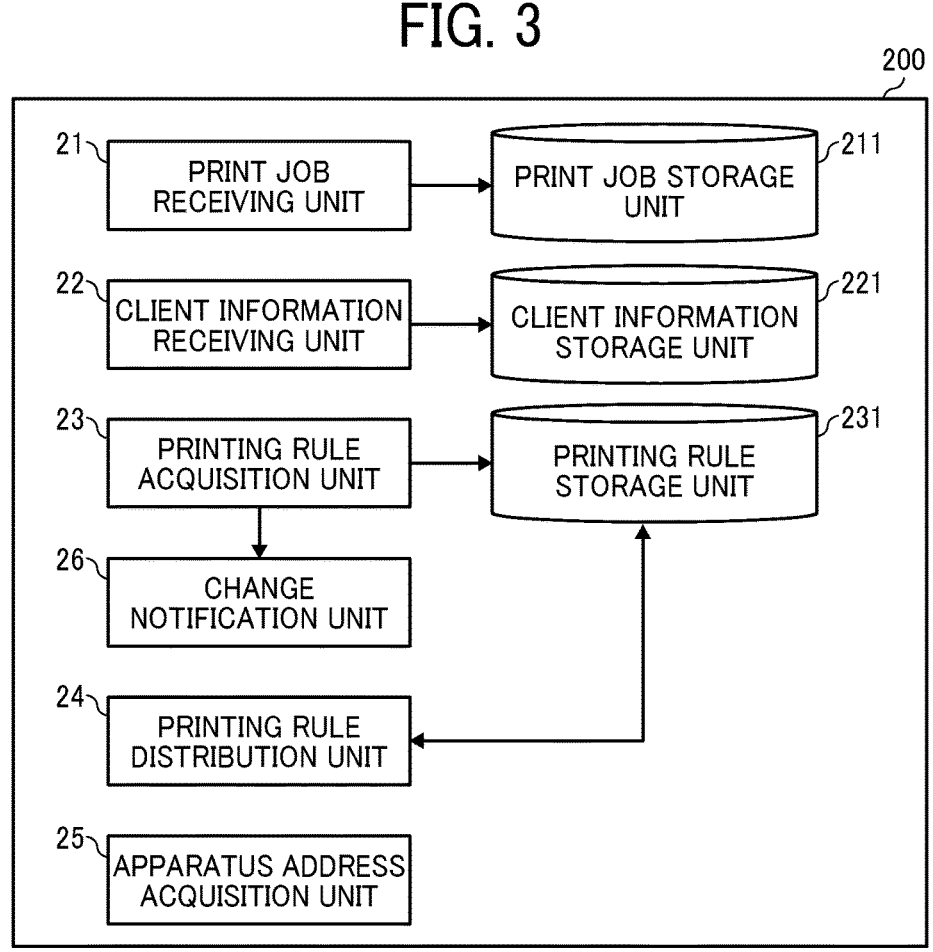
FIG. 3 is a schematic block diagram illustrating a functional configuration of a site server according to one of the embodiments.

FIG. 3 is a diagram illustrating a functional configuration of the print server 200 according to the present embodiment. The print server 200 includes a print job receiving unit 21, a client information receiving unit 22, a printing rule acquisition unit 23, a printing rule distribution unit 24, an apparatus address acquisition unit 25, and a change notification unit 26. Each of the above-mentioned functional units is implemented by executing, with the CPU 201, one or more programs installed in the print server 200.

The print server 200 also includes a print job storage unit 211, a client information storage unit 221, and a printing rule storage unit 231. Each of the above-mentioned storage units is implementable with, for example, the auxiliary memory 203. Alternatively, each of these storage units is implementable with a storage device connected to the print server 200 through a network.

The print job receiving unit 21 receives a print job transmitted from the print job transmission unit 16 of the client PC 100 and stores the print job in the print job storage unit 211.

The client information receiving unit 22 receives terminal information transmitted from the registration unit 19 of the client PC 100 and stores the terminal information in the client information storage unit 221.

The printing rule acquisition unit 23 acquires all the printing rules stored in the core server 600 in response to a change notification from the core server 600 and stores the acquired printing rules in the printing rules storage unit 231.

The apparatus address acquisition unit 25 acquires from the core server 600 an IP address of the MFP 300 that is the output apparatus and notifies the client PC 100 of the IP address according to a request from the client PC 100. The IP address is an output apparatus ID that uniquely identifies the MFP 300 that is the output apparatus.

The change notification unit 26 transmits a change notification to the client PC 100 in which the print server 200 is set as a data reference destination when the printing rule acquisition unit 23 newly acquires a printing rule and updates contents of the printing rule storage unit 231.

(Functional Configuration of MFP 300)

Figures 16, 17:
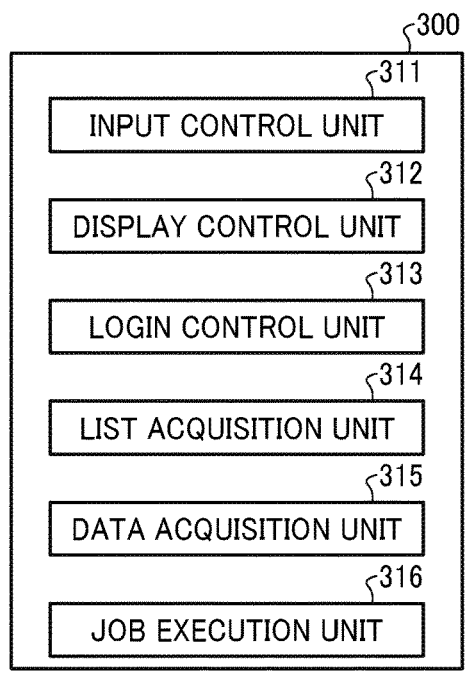
FIG. 16 is a schematic block diagram illustrating a functional configuration of the output apparatus according to one of the embodiments.
FIG. 17 is a table illustrating output destination information according to one of the embodiments.

FIG. 16 is a schematic block diagram illustrating a functional configuration of the MFP 300. The MFP 300 includes, for example, an input control unit 311, a display control unit 312, a login control unit 313, a list acquisition unit 314, a data acquisition unit 315, and a job execution unit 316. Each of these functional units is implemented by executing, with the CPU 301 of the MFP 300, one or more programs installed in the MFP 300.

The input control unit 311 interprets a user's instruction input via the control panel of the MFP 300, for example. The display control unit 312 causes the control panel to display information generated in processing operation performed with the MFP 300. The login control unit 313 controls login processing of a user who is to log in the MFP 300.

The list acquisition unit 314 requests the print server 200 set as a data reference destination in the MFP 300 for a list of print job information associated with the login user (print job list).

The data acquisition unit 315 acquires from the print server 200 or the client PC 100 print job information selected by the user from the print job list displayed on the control panel. The print job information includes address information indicating a storage destination of the print data related to the print job information. The data acquisition unit 315 acquires the print data based on the address information. The print data is data that is used for drawing a print image in the print job, for example, data in a page description language (PDL) format. Generally, an amount of data of the print data is greater than that of the print job information. Accordingly, in the embodiment, the print data selected as a print target is downloaded to the MFP 300. However, in addition to the print job list, the print data related to each print job information included in the print job list may be distributed on the network.

The job execution unit 316 controls printing of the print data acquired by the data acquisition unit 315. The job execution unit 316 executes print output based on the acquired print data.

(Functional Configuration of Core Server 600)

Figure 4:
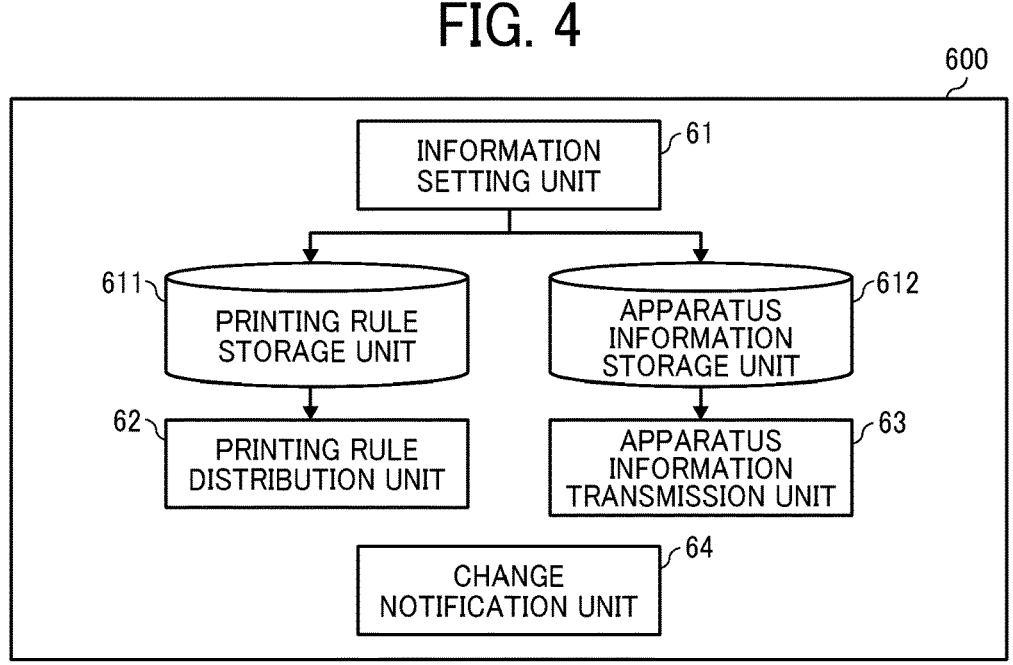
FIG. 4 is a schematic block diagram illustrating a functional configuration of a management server according to one of the embodiments.

FIG. 4 is a schematic block diagram illustrating a functional configuration of the core server 600. In the description of the embodiment, the hardware configuration of the core server 600 is substantially the same as the print server 200 illustrated in FIG. 14, and FIG. 14 is also used as a diagram illustrating the hardware configuration of the core server 600. The core server 600 includes an information setting unit 61, a printing rule distribution unit 62, an apparatus information transmission unit 63, and a change notification unit 64. Each of the above-mentioned functional units is implemented by executing, with the CPU 201 of the core server 600, one or more programs installed in the core server 600.

The core server 600 also includes a printing rule storage unit 611 and an apparatus information storage unit 612. Each of the above-mentioned storage units is implementable with, for example, the auxiliary memory 203 included in the core server 600. Alternatively, each of the above-mentioned storage units is implementable with a storage device connected to the core server 600 through a network.

The information setting unit 61 receives registration of a new printing rule to the printing rules centrally managed in the core server 600 and receives registration of apparatus information to all the apparatus information centrally managed in the core server 600, and stores the registered printing rules and the registered apparatus information to the printing rule storage unit 611 and the apparatus information storage unit 612. The "apparatus information" is association information associating a name with an IP address of each MFP 300 managed by the core server 600.

The printing rule distribution unit 62 transmits to the print server 200 corresponding stored information according to the request from the print server 200.

The apparatus information transmission unit 63 specify an IP address from a terminal name based on an inquiry request from the print server 200, and transmits the specified IP address, as a response, to the print server 200 that is a source of the inquiry.

The change notification unit 64 notifies the print server 200 of completion of the registration of the new printing rules to the printing rule storage unit 611.

[Data Structure]

A description is given of examples of data structures for various types of data used in the present embodiment. More specifically, the examples of the data structures of a "printing rule table" and an "association table" stored in the specific printing rule storage unit 131 of the client PC 100, the printing rule storage unit 231 of the print server 200, and the printing rule storage unit 611 of the core server 600 are described below.

FIG. 9A is an illustration of a centrally managed printing rule table 901, which is one of the printing rule tables, stored in the printing rule storage unit 611 of the core server 600. FIG. 9B is an illustration of a printing rule site table 902, which is another one of the printing rule tables, stored in the printing rule storage unit 231 of the print server 200. FIG. 9C is an illustration of a specific printing rule table 903, which is still another one of the printing rule tables, stored in the specific printing rule storage unit 131 of the client PC 100.

Each "printing rule table" is an information group including a "printing rule ID" uniquely identifying a printing rule, a "print condition" and a "print action" each of which are designated with the printing rule, and an "associated ID" for associating one of output destination information indicating an output apparatus to which the printing rule is applied and user information indicating a user. Each printing rule is also information that is registered and updated via the information setting unit 61 of the core server 600, and thereby includes information on an "update date and time (update time)" of the printing rule.

The centrally managed printing rule table 901 includes all of the printing rules that are centrally managed by the core server 600. The printing rule site table 902 includes the printing rules stored in the print server 200 for each site. The specific printing rule table 903 includes "specific printing rules" that are stored in the client PC 100 and selected and obtained according to specific condition.

The print server 200 selects and obtains the printing rules required in the site corresponding to the print server 200 from the centrally managed printing rule table 901 to generate the printing rule site table 902. In some of the embodiments, the print server 200 obtains all of the printing rules from the centrally managed printing rule table 901. The specific printing rule table 903 is generated by filtering the printing rule site table 902 in the client PC 100.

FIG. 10A illustrates a data table that is a centrally managed association table 1001 including association information associated with the printing rules that are stored in the printing rule storage unit 611 of the core server 600. FIG. 10B illustrates a data table that is a site association table 1002 including association information stored in the printing rule storage unit 231 of the print server 200. FIG. 10C illustrates a data table that is a specific association table 1003 including association information stored in the specific printing rule storage unit 131 of the client PC 100.

Each of the "association tables" illustrated in FIGS. 10A to 10C is an information group including an "associated ID" for uniquely identifying target information, an "output apparatus ID" that is output destination information uniquely identifying an output apparatus designated with the "associated ID", a "user ID" that is user information uniquely identifying a user, and a "secure printing applying" flag indicating a printing rule used when a type of a corresponding print job is secure printing. A printing rule corresponding to an associated ID of which the "secure printing applying" flag indicates "true" is used in the secure printing. The association information is also information that is registered and updated via the information setting unit 61 of the core server 600, and thereby includes information on an "update date and time (update time)" of the association information.

The centrally managed association table 1001 includes all of the association information that are centrally managed by the core server 600. The site association table 1002 includes the association information stored in the print server 200 for each site. The specific association table 1003 includes the association information that are stored in the client PC 100 and that are associated with the "specific printing rule(s)" selected and obtained according to specific condition.

The print server 200 selects and obtains the association information required in the site corresponding to the print server 200 from the centrally managed association table 1001 to generate the site association table 1002. In some of the embodiments, the print server 200 obtains all of the printing rules from the centrally managed association table 1001. The specific association table 1003 is generated by filtering the site association table 1002 in the client PC 100.

FIG. 17 is an illustration of an "output apparatus table 1701" that is stored in the apparatus information storage unit 612 of the core server 600. The output apparatus table 1701 includes an output apparatus ID and an internet protocol (IP) address that are associated with each other so that one of the output apparatuses (MFP 300) having the IP address is identified with the corresponding output apparatus ID. When the client PC 100 send a query for an output apparatus ID to the print server 200, the print server 200 refers the output apparatus table 1701 stored in the core server 600 to specify the IP address.

FIG. 11 is an illustration of a "terminal information table 1101" that is stored in the client information storage unit 221 of the print server 200. The terminal information table 1101 is a data table storing terminal information transmitted to the print server 200 when the client PC 100 starts up. The terminal information table 1101 includes a "terminal ID", a "terminal name", and an "IP address" that are associated with each other and includes in the terminal information of the client PC 100.

FIG. 12 is an illustration of an "output destination history table 1201" stored in the output history storage unit 141 of the client PC 100. The output destination history table 1201 is a data table stored in the output history storage unit 141 and stores the IP address of the output apparatus (MFP 300) that is used when a print job is executed.

<Information Processing Method>

A description is given below of an information processing method and information processing program according to the present embodiment. The information processing method according to the embodiment is performed by executing the information processing program in the client PC 100, which is one of the embodiments of the information processing apparatus, as described above. Steps of the information processing program are described in detail below.

<Pre-processing of Distribution Process>

Figure 5:
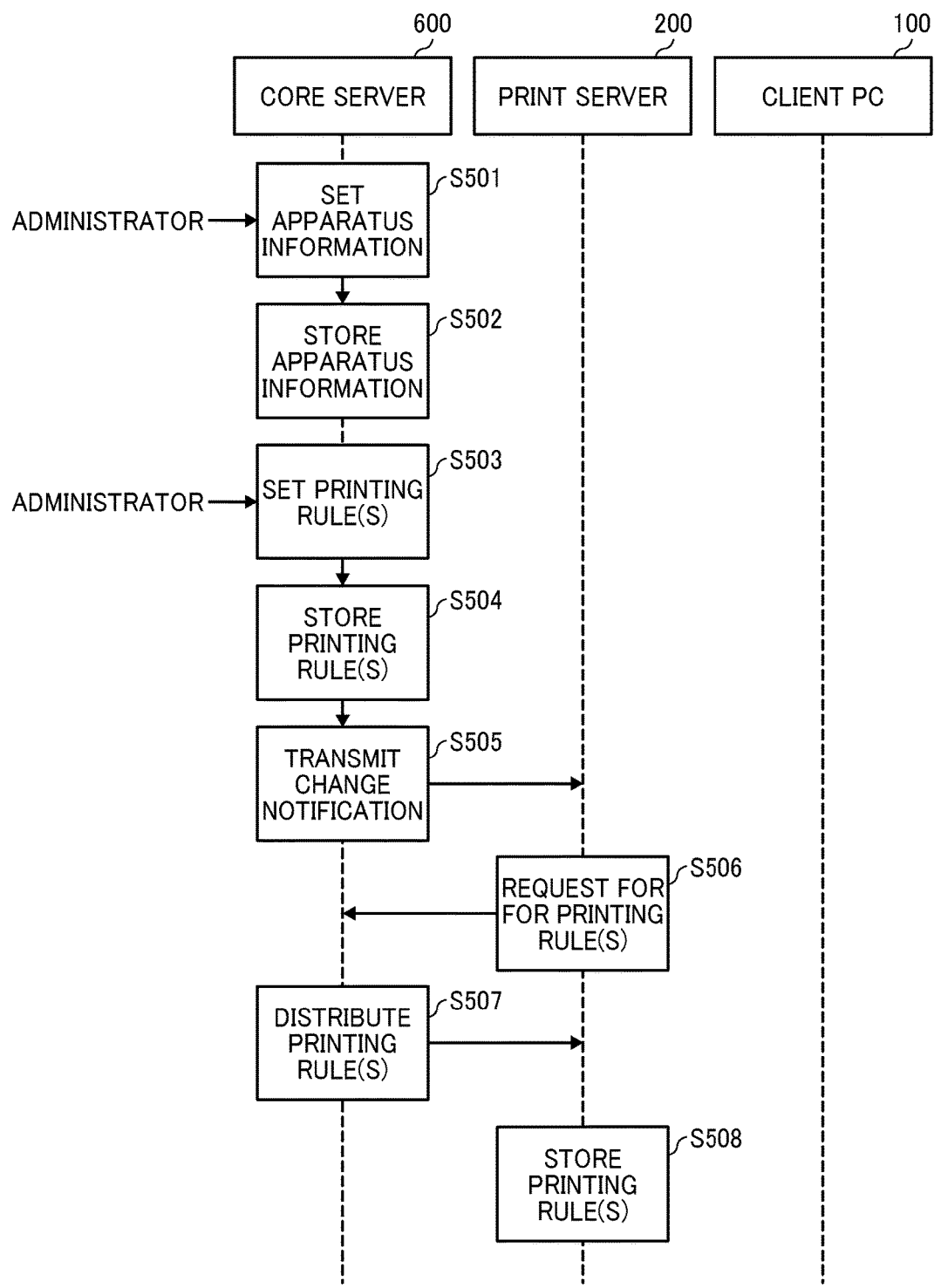
FIG. 5 is a sequence diagram illustrating pre-processing performed in a former step of distribution of a printing rule in an information processing method according to one of the embodiment.

FIG. 5 is a sequence diagram illustrating pre-processing performed in a former step of a process of obtaining with the client PC 100 a specific printing rule. The pre-processing is performed by the core server 600 and the print server 200.

An administrator operates the core server 600 to set the apparatus information (e.g., IP address) of the print server 200 and the MFP 300 that are arranged as targets to be managed, in advance (S501). The apparatus information storage unit 612 stores and accumulates the apparatus information, which is input in S501 (S502).

The administrator also operates the core server 600 to set all of the printing rules to be applied to the MFP 300, which is set as the target to be managed and serves as output apparatus, in advance (S503). The printing rule storage unit 611 stores and accumulates the printing rule(s), which is input in S503 (S504).

Subsequently, the change notification unit 64 of the core server 600 transmits a "change notification" to the print server 200 according to an update of the printing rule storage unit 611 (S505).

In response to the change notification received from the core server 600, the print server 200 transmits a rule-acquisition request and requests to the core server 600 for (a) printing rule(s) (S506). In response to the rule-acquisition request received form the print server 200, the printing rules distribution unit 62 of the core server 600 reads the printing rule(s) from the printing rule storage unit 611 and distributes the read printing rule(s) to the print server 200 (S507). The print server 200 receives the printing rule(s) and adds the received printing rule(s) to the printing rule site table 902 to update the printing rule site table 902 (S508). In S507, the printing rule(s) to be distributed may be all of the printing rules stored in the centrally managed printing rule table 901, or some of the printing rules that are selected based on the IP address of the print server 200.

<Printing Rule Distribution Process>

Figure 6:
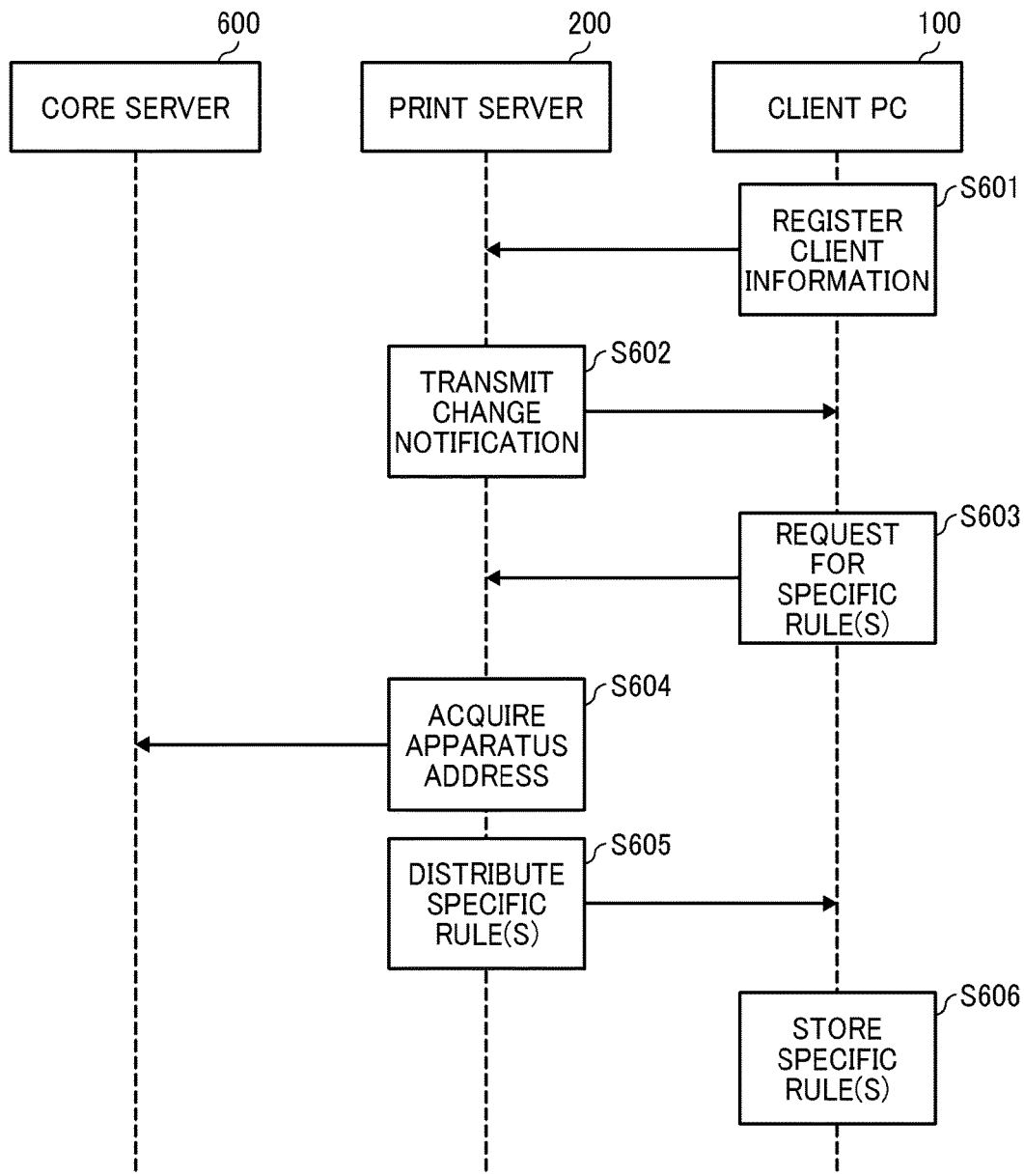
FIG. 6 is a sequence diagram illustrating processing of distributing the printing rule in an information processing method according to one of the embodiment.

FIG. 6 is a sequence diagram illustrating a process of obtaining and storing the specific printing rule performed by the client PC 100. The client PC 100 performs registration processing by transmitting the terminal information, which includes the own IP address, to the print server 200 when starting up (S601).

The change notification unit 26 of the print server 200 transmits a change notification to the client PC 100 when the printing rules stored in the print server 200 is updated (S602). In response to the change notification received in S602, the client PC 100 transmits the output destination history table 1201 stored in the output history storage unit 141 to the print server 200 to request for (a) specific printing rule(s) (S603).

The "specific printing rule(s)" requested in S603 is (are) printing rules that is (are) associated with an IP address included in the output destination history table 1201 and is (are) to be applied the print job for the secure printing, and is (are) selected according to the printing rule site table 902 and the site association table 1002, which are stored in the printing rule storage unit 231 of the print server 200 that is set as a reference destination of the client PC 100. The specific printing rule(s), accordingly, is (are) selected from the printing rules stored in the print server 200, and to be applied to a print job that is previously output from the MFP 300 with the client PC 100 and to be used in performing the secure printing. An "output apparatus ID" is used as information to identify an output apparatus in the site association table 1002 and the printing rule site table 902, which are stored in the print server 200. The print server 200 acquires the output apparatus ID based on the IP address received in S603 (S604).

In S604, the print server 200 refers the apparatus information storage unit 612 of the core server 600 to specify the output apparatus ID based on the IP address, and refers the site association table 1002 stored in the printing rule storage unit 231 using the specified output apparatus ID to specify the information. The print server 200 distributes the specific printing rule(s) of the printing rule site table 902 that is (are) associated with the information specified in the site association table 1002, and has (have) "true" in the field related to the secure printing application in the association table 1002 (S605).

With the specific printing rule(s) distributed in S605 and acquired with the specific printing rule acquisition unit 13, the specific printing rule table 903 and the specific association table 1003 stored in the specific printing rule storage unit 131 of the client PC 100 are updated (S606).

The specific printing rule(s) stored in the specific printing rule storage unit 131 is used for executing printing with the client PC 100.

As described above, the printing rule(s) that has (have) highly possibility to be used by the client PC 100 is (are) selected from the printing rules in the rule-based printing system 1 and distributed to the client PC 100 as the specific printing rule(s). This reduces the number of printing rules to be distributed to the client PC 100, resulting in reduction of the processing load of the client PC 100 and the load of the communication network 700.

<Storing Print Job>

Figure 7:
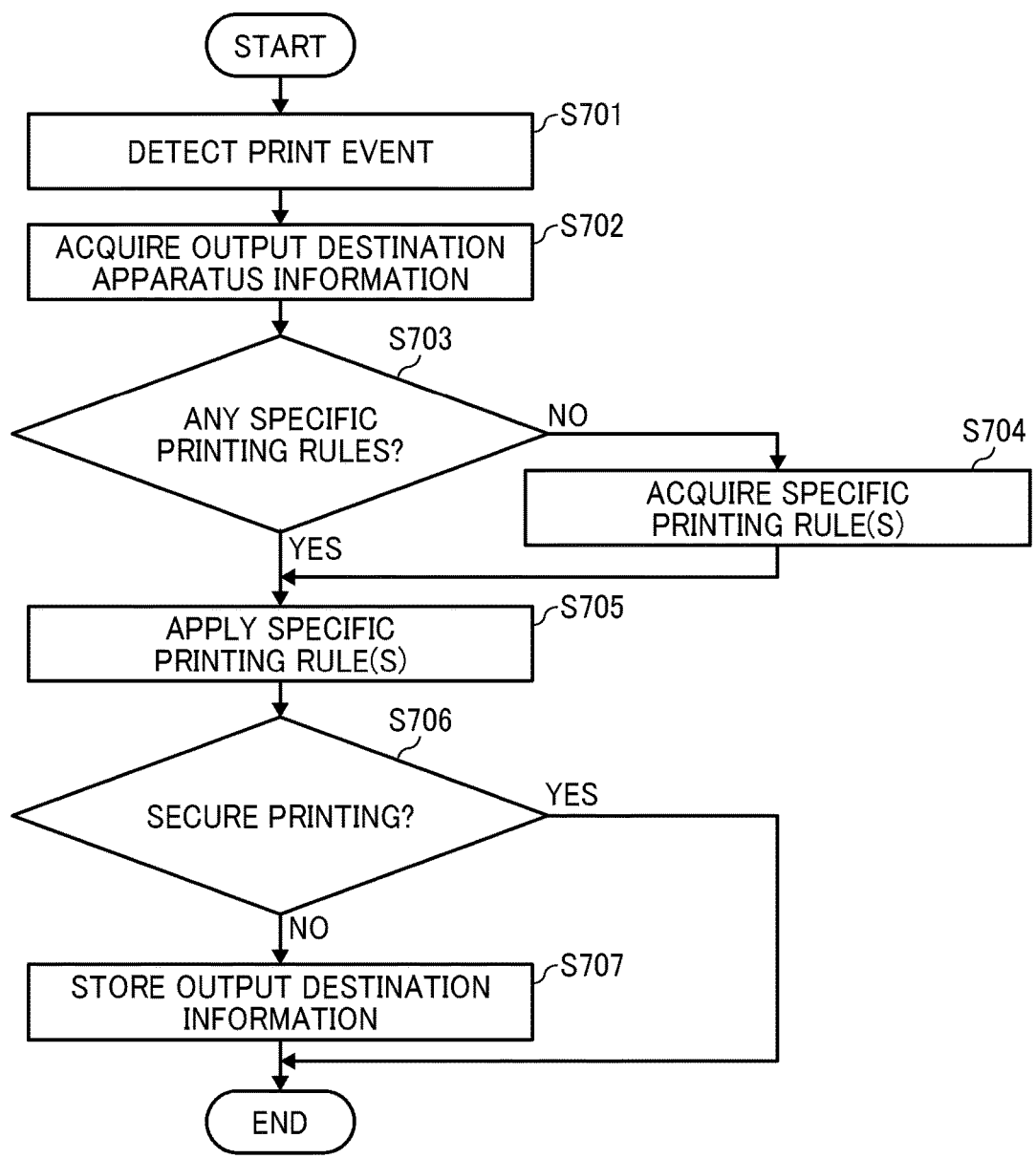
FIG. 7 is a flowchart illustrating a process of storing a print job according to one of the embodiments.

A description is given below of a process of storing a print job, performed by the client PC 100 with reference to a flowchart of FIG. 7. On executing a print job from, for example, a document creation software with the client PC 100, the printer driver 111 generates print data to be stored in the print spooler 112. The spooler monitoring unit 11 obtains the print data stored in the print spooler 112 and transfers the print data to the output destination apparatus information acquisition unit 12 (S701).

The output destination apparatus information acquisition unit 12, subsequently, acquires the output destination information from the print data transferred, and transfers to the specific printing rule acquisition unit 13 the output destination information along with the print data (S702). There are two cases according to an output destination indicated with the output destination information, one is a case where the print data is for "direct printing" and the other case is a case where the print data is for the "secure printing". In the case where the print data is for the direct printing, the MFP 300 that is the output destination of the print data is designated so that the IP address of the MFP 300 is included in the output destination information. In the case of the secure printing, the output destination information does not include the IP address.

Subsequently, the specific printing rule acquisition unit 13 refers the specific printing rule storage unit 131, and determines an presence or absence of the specific printing rule(s) associated with the output destination information transferred from the output destination apparatus information acquisition unit 12 (S703). When S703 determines that there is no specific printing rule (S703: NO), the client PC 100 acquires from the print server 200 the specific printing rules associated with the output destination information (S704).

When the specific printing rule(s) associated with the output destination information transferred from the output destination apparatus information acquisition unit 12 is (are) stored in the specific printing rule storage unit 131 (S703: YES), the print job is executed in a manner that the specific printing rule(s) is (are) applied (S705). Additionally, after the specific printing rule(s) associated with the output destination information is (are) acquired from the print server 200, the specific printing rule(s) is (are) applied to the print job, and the print job is executed (S705).

When the print job executed in S705 is associated with the secure printing (S706: YES), the output apparatus (MFP 300) of the print job is not specified. In this case, storing the print job is completed without generating the output history data and without updating the output destination history table 1201 even when the print job to which the specific printing rule(s) is (are) applied is executed.

When the print job executed in the S705 is not associated with the secure printing (S706: NO), the output apparatus (MFP 300) of the print job is determined. In this case, when the print job to which the specific printing rule(s) is (are) applied is executed, the output destination history table 1201 is updated by storing the output destination information (S707), and then the process of storing the print job is completed.

<Releasing Print Job>

Figure 8:
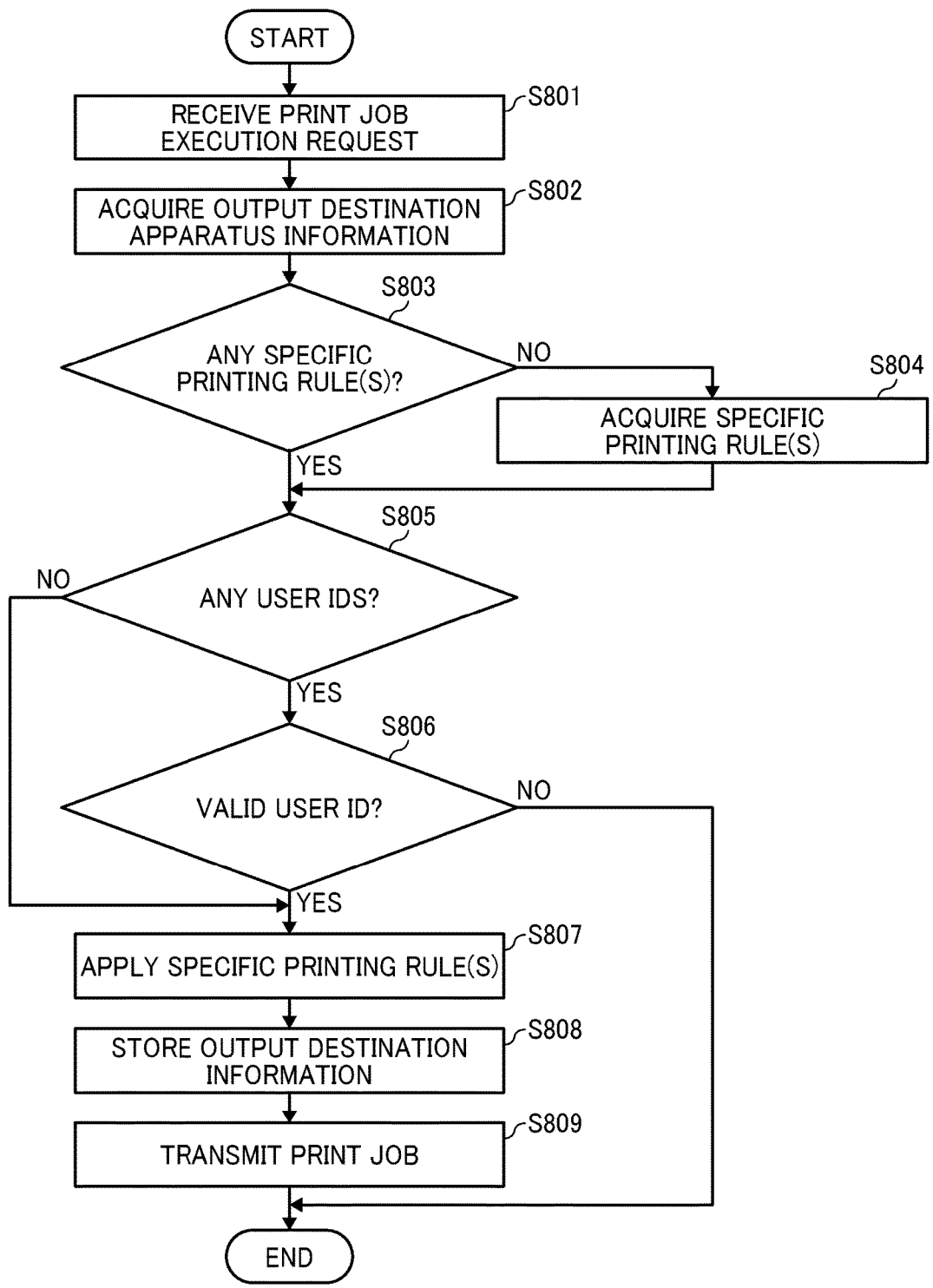
FIG. 8 is a flowchart illustrating a process of executing a print job according to one of the embodiments.

A description is given below of a process of releasing a print job stored in the client PC 100 in response to a print job execution request from the MFP 300 with reference to a flowchart of FIG. 8. In response to a print job execution request from the MFP 300, the print job request receiving unit 17 of the client PC 100 corresponding to the request source receives the print job execution request and transfers a print job to the output destination apparatus information acquisition unit 12 (S801).

The output destination apparatus information acquisition unit 12 acquires output destination information included in the print job and transfers the output destination information along with the print data to the specific printing rules acquisition unit 13 (S802). The output destination information acquired in S802 is the IP address of the MFP 300 that is a request source of execution of the print job.

Subsequently, the specific printing rule acquisition unit 13 refers the specific printing rule storage unit 131, and determines an presence or absence of the specific printing rule(s) associated with the output destination information transferred from the output destination apparatus information acquisition unit 12 (S803). When S803 determines that there is no specific printing rule (S803: NO), the client PC 100 acquires from the print server 200 the specific printing rule(s) associated with the output destination information (S804).

When the specific printing rule(s) associated with the output destination information transferred from the output destination apparatus information acquisition unit 12 is (are)

stored in the specific printing rule storage unit 131 (S803: YES), the process proceed to S805 and S805 determines whether a user ID is designated with the specific printing rule(s). Additionally, after the specific printing rule(s) associated with the output destination information is (are) acquired from the print server 200, the determination whether a user ID is designated with the specific printing rule(s) is also made (S805). If there is no user ID designated (S805: NO), the specific printing rule(s) are performed (S807).

If there is a user ID designated with the specific printing rule(s) (S805: YES) and the user ID designated with the specific printing rule(s) includes a user ID that identifies a user who requested execution of the print job (source of the print job execution request) (S806: YES), the specific printing rule(s) is (are) performed (S807). If there is a user ID designated with the specific printing rule(s) (S805: YES) and the user ID designated with the specific printing rule(s) does not match the user ID that identifies a user who requested execution of the print job (source of the print job execution request) (S806: NO), the process is completed.

With a history that the specific printing rule(s) is (are) performed in S807, the output destination history table 1201 is updated (S808), and the print job to which the specific printing rule(s) is (are) applied is transmitted to the MFP 300 that is the request source (S809).

As described above, according to the embodiment, in execution of a print job according to, in particular, the secure printing, the specific printing rule(s) is (are) applied to the print job when the print job is generated and stored. After that, when the stored print job is executed, the specific printing rule(s) is (are) applicable. The rule to be applied is also variable depending on a situation or a case, for example, a time and a target user. For example, when a first user generates a print job having confidential information in the day time, other user than the first user are forbidden to execute the print job in the night.

To distribute to the client PC 100 such a complicated printing rule as described above is conventionally requires to distribute a number of the printing rules. The client PC 100 according to the present embodiment, on the other hand, acquires the printing rules by selecting based on history of the print job execution. This results in efficient distribution of the printing rule(s). This also reduces load of processing related to the printing rules, even when the number of printing rules (an amount of data) to be distributed is large, such as in a large-scale system.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing device, comprising:
a memory configured to store a print job to be executed via an image forming apparatus and a designated printing rule; and
circuitry configured to:
acquire, from an external device, the designated printing rule according to a designated condition, the designated printing rule acquired being stored in the memory, the external device being configured to acquire and store printing rules including the designated printing rule acquired, each printing rule of the printing rules defusing at least a part of printing settings to be applied in executing the print job;
acquire, from the memory, the designated printing rule according to an attribute of printing associated with the print job in execution of the print job; and
execute the print job while applying the designated printing rule acquired from the memory, wherein the memory is further configured to store a history table of a history of output in response to execution of the print job performed by the circuitry, wherein in response to receipt of an indication of printing rules of the external device being updated, the circuitry is further configured to transmit the history table to request acquisition of the designated printing rule, and wherein the designated printing rule is associated with an IP address of the information processing device, included in the history table, applicable to a further print job for secure printing.

2. The information processing device of claim 1, wherein the history of output includes information indicating an output destination of the print job.

3. The information processing device of claim 1, wherein the designated printing rule acquired includes association information associating the part of print settings to be applied in executing the print job and a target to be applied with the print settings.

4. The information processing device of claim 3, wherein the association information includes output destination information indicating an output destination of the print job and user information identifying a user requesting the print job, and a type of the print job.

5. The information processing device of claim 1, wherein the circuitry is configured to apply the designated printing rule before the print job is stored in the memory, and is configured to apply the print job during execution via the image forming apparatus.

6. An information processing method, comprising:
receiving an instruction to execute a print job via an image forming apparatus;
acquiring, from an external device, a designated printing rule according to a condition, the external device storing printing rules acquired including the designated printing rule, each printing rule of the printing rules defining at least a part of printing settings to be applied in executing the print job;
storing, in a memory, the designated printing rule acquired;
acquiring, from the memory, the designated printing rule according to an attribute of printing associated with the print job in executing the print job;
executing the printing job while applying the designated printing rule acquired; and
storing a history table of a history of output in response to the executing of the print job, wherein in response to receipt of an indication of printing rules of the external device being updated, transmitting the history table to request acquisition of the designated printing rule, and wherein the designated printing rule is associated with an IP address of the information processing device, included in the history table, applicable to a further print job for secure printing.

7. The information processing method of claim 6, wherein the history of output includes information indicating an output destination of the print job.

8. The information processing method of claim 6, wherein the designated printing rule acquired includes association information associating the part of print settings to be applied in executing the print job and a target to be applied with the print settings.

9. The information processing method of claim 8, wherein the association information includes output destination information indicating an output destination of the print job and user information identifying a user requesting the print job, and a type of the print job.

10. The information processing method of claim 6, wherein the applying includes applying the designated printing rule before storing the print job, and includes applying the designated printing rule during the executing of the print job via the image forming apparatus.

11. A non-transitory recording medium storing a plurality of instructions which, in response to execution of one or more processors, cause the processors to perform a method, comprising:

receiving an instruction to execute a print job via an image forming apparatus;

acquiring, from an external device, a designated printing rule according to a condition, the external device storing printing rules acquired including the designated printing rule, each printing rule of the printing rules defining at least a part of printing settings to be applied in executing the print job;

storing, in a memory, the designated printing rule acquired;

acquiring, from the memory, the designated printing rule according to an attribute of printing associated with the print job in executing the print job;

executing the printing job while applying the designated printing rule acquired; and storing a history table of a history of output in response to the executing of the print job, wherein in response to receipt of an indication of printing rules of the external device being updated, transmitting the history table to request acquisition of the designated printing rule, and wherein the designated printing rule is associated with an IP address of the information processing device, included in the history table, applicable to a further print job for secure printing.

12. The non-transitory recording medium of claim 11, wherein the history of output includes information indicating an output destination of the print job.

13. The non-transitory recording medium of claim 11, wherein the designated printing rule acquired includes association information associating the part of print settings to be applied in executing the print job and a target to be applied with the print settings.

14. The non-transitory recording medium of claim 13, wherein the association information includes output destination information indicating an output destination of the print job and user information identifying a user requesting the print job, and a type of the print job.

15. The non-transitory recording medium of claim 11, wherein the applying includes applying the designated printing rule before storing the print job, and includes applying the designated printing rule during the executing of the print job via the image forming apparatus.

* * * * *